United States Patent [19]
Bauman et al.

[11] 3,876,376
[45] Apr. 8, 1975

[54] LINEAR DETERMINATION OF HEMOLYTIC COMPLEMENT ACTIVITY IN UNDILUTED SERUM

[75] Inventors: Norman Bauman, Nanuet, N.Y.; John A. Brockman, Woodcliff Lake, N.J.

[73] Assignee: American Cyanamid Company, Stamford, Conn.

[22] Filed: May 9, 1974

[21] Appl. No.: 468,620

[52] U.S. Cl........... 23/230 B; 23/259; 195/103.5 R; 424/12
[51] Int. Cl.... C12k 1/00; G01n 31/20; G01n 33/16
[58] Field of Search...... 23/230 B, 253 R, 254, 292; 195/103.5, 127; 424/12, 13

[56] References Cited
UNITED STATES PATENTS

| | | | |
|---|---|---|---|
| 3,223,484 | 12/1965 | Fisk | 424/12 |
| 3,554,704 | 1/1971 | Ushakoff | 23/230 B |
| 3,574,063 | 4/1971 | Bowman | 195/103.5 R |
| 3,733,398 | 5/1973 | Shulman | 424/13 |
| 3,838,013 | 9/1974 | Bergeron | 195/103.5 R X |

Primary Examiner—Robert M. Reese
Attorney, Agent, or Firm—Jack W. Richards

[57] ABSTRACT

A capillary tube diffusion method for determining the hemolytic complement activity in undiluted serum involving a linear zone of lysis in a gel containing sensitized erythrocytes, a method of preparing capillary tubes for use in said method and the capillary tubes used in and resulting from the practice of said method.

16 Claims, 2 Drawing Figures

LINEAR DETERMINATION OF HEMOLYTIC COMPLEMENT ACTIVITY IN UNDILUTED SERUM

BACKGROUND OF THE INVENTION

This invention is applicable in the field of diagnostics and is concerned with a heretofore unknown linear diffusion method for measuring the hemolytic complement activity in undiluted serum.

The determination of the concentration of hemolytic complement in undiluted serum is clinically important since the level of complement can be used as a diagnostic tool indicative of certain clinical syndromes such as glomerulonephritis, systemic lupus erythematosus, serum sickness, transplantation rejection, and in theory, therapy with a complement inhibitory drug.

The importance of the method of this invention lies in its ease of application and in its ability to measure the depression of serum complement actually attained due to administration of a given compound. It is vital that such a diagnostic procedure be performed on undiluted serum so that the effect of the compound administered will not be lost by dilution. Until this procedure was developed there was no convenient method known for the determination of hemolytic complement in undiluted serum.

Mayer, M. M. in Kabat and Mayer's Experimental Immunochemistry, by Kabat, E. A. and Mayer, M. M., Charles C. Thomas, Springfield, Ill., (1961), pp. 149-153, discloses a titration procedure for measuring hemolytic complement using diluted serum. An unquestionable advantage of the present method over the Mayer procedure is that in the former the serum is assayed undiluted. Dilution results in loss of effect of reversible inhibitors, making dilution assays, such as the Mayer procedure, unsuitable for following therapy with such inhibitors. Glovsky, M. M. et al., Journal of Immunology, 102:1 (1969) discloses a kinetic method which can be adapted to assaying undiluted serum for hemolytic complement activity. However, the Glovsky et al. method consumes large quantities of sensitized erythrocytes, requires careful control of conditions, requires multiple samples and involves obtaining data on each sample at several closely spaced time intervals. Thus, the Glovsky et al. method is not suited to handle large or even moderate numbers of samples on a routine basis and as such is not effective as a clinical diagnostic tool or for following therapy. It is known that Kallestad Laboratories Inc., Minneapolis, Minn., markets a total complement kit containing an agar plate in which are embedded sensitized erythrocytes. Serum is dropped into wells in the plate and allowed to diffuse radially, causing a circular zone of lysis. However, as the serum diffuses radially, the concentration of each constituent falls off as the square of the radius, effectively diluting any drug contained in the sample. Thus, the Kallestad test cannot reliably demonstrate the degree of complement inhibition attained by administration of a drug.

The requirement that the serum be undiluted is literally not attainable by any heretofore known method. In accordance with the presently disclosed procedure, a relatively large volume of serum is allowed to diffuse linearly into a small volume of matrix resulting, because of geometric factors, in minimal dilution.

SUMMARY OF THE INVENTION

The invention is concerned with a method for determining the hemolytic complement activity in undiluted serum using a linear diffusion method which measures a linear zone of lysis in a capillary tube, with a method of preparing a capillary tube for use in determining the hemolytic complement activity in undiluted serum by linear diffusion and with the capillary tubes used in said method and resulting from the practice of said method.

The invention contemplates a linear diffusion method for determining the hemolytic complement activity in undiluted serum which comprises, placing undiluted serum in interfacial contact with a suspension of sensitized erythrocytes in a buffered solidified gel contained in a capillary tube, incubating the tube containing the serum and gel for a time sufficient to obtain a linear zone of lysis in said gel and measuring the length of the zone and comparing it with a standard curve for quantitation. The invention includes as one specific embodiment thereof such a method which comprises placing undiluted serum in the open end of an otherwise sealed capillary tube in interfacial contact with a suspension of sensitized erythrocytes in a buffered solidified gel contained in the capillary tube, sealing the open end and incubating, measuring and comparing, as set forth hereinabove.

The invention also contemplates an incubated capillary tube for determining the hemolytic complement activity in undiluted serum by linear diffusion containing sensitized erythrocytes in a solidified buffered gel in interfacial contact with undiluted serum, the gel having a linear zone of lysis therein extending from said interface. The invention includes as specific embodiments here both closed and open incubated capillary tubes.

The invention further contemplates a method for preparing a sealed capillary tube for use in determining the hemolytic complement activity in undiluted serum by linear diffusion which comprises, inserting the open end of an otherwise sealed capillary tube in a suspension of sensitized erythrocytes in a liquid buffered gel in a container adapted for drawing a vacuum, drawing a partial vacuum on said container containing the tube to remove some of the trapped air out of said tube through the open end thereof, allowing liquified gel to enter said tube through the open end thereof upon release of said vacuum, removing the tube from the container and closing the open end of said tube.

The invention still further contemplates an unincubated capillary tube for determining the hemolytic complement activity in undiluted serum by linear diffusion containing sensitized erythrocytes in a solidified buffered gel with an air space in interfacial contact with said gel for receiving said serum. One specific embodiment here is an unincubated sealed capillary tube containing sensitized erythrocytes in a buffered gel with an air space above said gel and in interfacial contact therewith for receiving said serum, upon opening the end of said capillary tube above said gel.

The invention also contemplates kits or packages ready for use in the determination of the hemolytic complement activity in undiluted serum chiefly comprising a plurality of sealed and/or unsealed unincubated capillary tubes disclosed, or prepared as set forth, herein each containing a suspension of sensitized erythrocytes in a buffered solidified gel and air space in interfacial contact with said gel for receiving the undiluted serum to be tested for hemolytic complement activity. Such kits or packages provide an element of convenience and ease for those who carry out such tests.

DETAILED DESCRIPTION OF THE INVENTION

Figure 1:
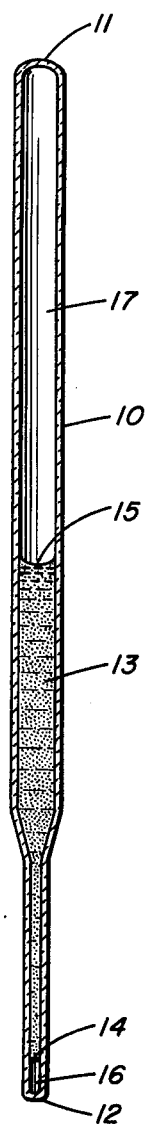
FIG. 1, is a schematic diagram of one embodiment of the present invention representing a sealed, non-serum containing and unincubated capillary tube filled with sensitized erythrocytes in agar or agarose for use in the practice of the invention.

In the practice of the present invention, sensitized erythrocytes are suspended in a buffered liquid gelling agent such as agar or agarose in a capillary tube. Any gelling agent which is not detrimental to the sensitized erythrocytes or complement components may be used. The concentration of gelling agent is chosen to meet the requirements for mechanical strength and convenience of preparation. If too much gelling agent is used, the high melting point may damage the erythrocytes, or the high viscosity may make it difficult to fill the capillaries. If too little gelling agent is used, the gel may not have enough mechanical stability for the manipulations required by the procedure. Expense is another factor in considering the concentration of gelling agent to be used.

Specific gelling agents which have been used and which are deemed suitable include Ionagar No. 2, Consolidated Laboratories, Inc., and Agarose (Special Grade), Mann Research Laboratories. A concentration of 0.7 percent agar (Ionagar No. 2) or 0.5 percent agarose (Special Grade) has been found to give sufficient physical strength for the manipulations required, although somewhat higher concentrations are preferred. An experiment was conducted in which the concentration of agar was varied from 0.7 to 1.5 percent. The result shows that as the agar concentration is increased, the hemolytic distance is decreased. Another test, in which agarose was used as the gelling agent, was carried out to determine the effect of agarose concentration, wherein the concentration of agarose was also varied from 0.7 to 1.5 percent. The same relationship was found as for agar, but in addition it was noted that in agarose the hemolytic distance is substantially greater than in similar concentration of agar.

Since the well known anti-complement activity of agar can be neutralized by diethylaminoethyldextran, an experiment was conducted to determine the effect of it. The results show that the addition of 0.1 percent diethylaminoethyldextran did not change the hemolytic distance in agarose, but gave a dramatic increase in hemolytic distance when added to agar.

Any of the common buffers normally used to buffer sensitized erythrocytes may be used. A particular buffer which has been used and found suitable is the barbital-buffered saline of Mayer, supra, omitting the gelatin and containing penicillin and streptomycin.

The upper and lower limits for the sensitized erythrocyte concentration are chosen to meet the requirements of test readability and visibility. If either too few or too many cells are used, the linear zone of lysis in the gel is difficult to read. A practical concentration of sensitized erythrocytes deemed suitable ranges from $0.5 \times 10^8$ to $4 \times 10^8$ cells/ml. of gel. A concentration of sensitized erythrocytes of $1 \times 10^8$ to $2 \times 10^8$ cells/ml. of agar or agrose has been found to give satisfactory contrast for easy visualization of both the agar/serum or agarose/serum interface and the hemolyzed/unhemolyzed cell interface.

The temperature of incubation must be high enough to allow the hemolytic reaction to take place and low enough to avoid destruction of the complement before the reaction takes place. A practical range is from about 20° to about 40°C. The time of incubation is chosen for convenience but must be long enough so that the zone of lysis is of sufficient length to allow the desired accuracy of measurement.

From the foregoing, it was determined that the optimal conditions for the method of this invention include sensitized erythrocytes at $1.5 \times 10^8$ cells/ml., agar or agarose at 1.0 percent, length of agar or agarose and serum columns 17 mm. and 15 mm., respectively, incubation at room temperature (24°C.), overnight (up to 24 hours) or at 37°C. for shorter times (4 to 6 hours). A standard dilution curve is prepared for each assay so that unknowns can be evaluated as percent of standard, i.e., 100 divided by the equivalent dilution as read from the curve. Quadruplicates are averaged for each point of the standard curve. Each unknown sample is evaluated in duplicate.

The capillaries which may be used in the practice of the method of this invention include sealed capillaries, i.e., those closed at one or both ends and capillaries open at both ends. Practical considerations dictate the length and diameter of the capillary. However, the smallest part of the capillary tube must be large enough to allow red cells and liquid gelling agents to enter and small enough to support the gel column during manipulation, such as gentle centrifugation. A suitable over-all length for the capillary tube is 6.5 cm. and a suitable diameter is 0.9 to 1.1 mm. The essential requirement for the practice of this invention is that the geometry of the equipment must force the diffusion to take place in an essentially linear manner rather than a circular or spherical manner. The capillary may be made of glass, plastic or any other material which is not detrimental to the cells or gel and which is sufficiently transparent to allow for visibility of the linear zone of lysis in the gel.

In the preparation of capillaries filled with sensitized erythrocytes in agar, it was found necessary to expose the sensitized erythrocytes to a temperature of 50°–55°C. for a short time so that the agar remains fluid during the filling process. In practice, 2 minutes exposure at 50°–55°C. is sufficient to fill the capillaries. However, to study the possible effect of more exposure to heat, an experiment was conducted in which the time at 50°–55°C. was increased to 7 minutes. Also, in the routine use of the test method of this invention, it is convenient to prepare the capillaries and the test samples independently. Therefore, the effect of allowing prepared capillaries to stand before use was examined. It was determined that neither additional heating time at 50°–55°C. nor standing of the capillaries overnight materially affect the test method.

In practice, the mixture of sensitized erythrocytes and gelling agent is allowed to gel in one end of the capillary tube. A serum sample is placed in the tube, in contact with the gel and after incubation a linear zone of lysis is observed in the gel. (An alternate, practical method is described in Example 3.) The length of the linear zone is related to the concentration of hemolytic complement in the serum sample and is compared with a standard curve for quantitation. The technical skills required for this diagnostic procedure are easily acquired and on a routine basis one person can perform 35 to 40 assays per day.

With reference to the drawing, FIG. 1 is a schematic diagram of sealed or closed transparent glass capillary tube 10, flame or heat sealed at ends 11 and 12 containing a suspension of sensitized erythrocytes in buffered agar or agarose 13 in interfacial contact at interfaces 14 and 15 with trapped air 16 and 17. Capillary tube 10 is ready for introduction of the serum sample at end 11, upon breaking open end 11.

Figure 2:
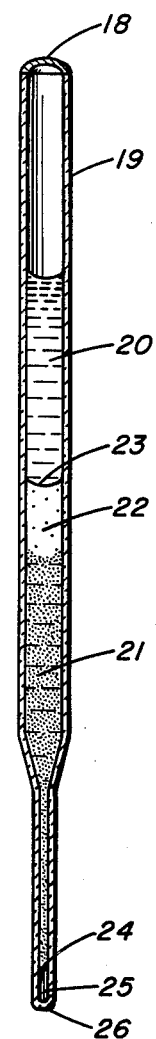
FIG. 2, is a schematic diagram of the same embodiment represented in FIG. 1, showing a sealed and incubated capillary tube filled with sensitized erythrocytes in agar or agarose with serum above the agar or agarose and a linear zone of lysis in the agar or agarose.

In use, end 11 of FIG. 1 is snapped open and the serum sample introduced into capillary tube 10 at now open end 11 with a micropipet, or the like. After introduction of the serum sample into capillary tube 10, open end 11 is sealed with paraffin, or the like. In FIG. 2, open end 11 is shown as sealed end 18. FIG. 2 shows a sealed and incubated capillary tube 19 containing serum sample 20 and sensitized erythrocytes in buffered agar or agarose 21 with a zone of lysis 22 extending linearly from the serum sample agar or agarose interface 23 toward interface 24 with trapped air 25 at end 26. To measure the zone of lysis 22, capillary tube 19 is examined under a microscope containing an eyepiece micrometer, the zero point of the micrometer is set at the estimated lysis/no lysis interface, and a reading is taken at the agar or agarose meniscus.

The invention will be more fully detailed by the following specific examples.

EXAMPLE 1

Reagents Employed

Agarose (Special Grade), Mann Research Laboratories.

Sensitized erythrocytes, sheep red blood cells from whole blood stored in Alsever's solution sensitized with commercial rabbit antibody in the presence of ethylenediamine tetracetic acid, according to the method of Ruddy, S. and Austen, K. F. [Journal of Immunology 99, 1162 (1967)]. Stored at 4°C., with $5 \times 10^8$ cells/ml. in barbital-buffered saline (VBS) containing penicillin and streptomycin.

Preparation of Capillary Tubes

Capillary tubes are prepared from glass capillaries 0.9 to 1.1 mm. interior diameter 90 mm. long, sealed at one end (Kimax-51$^R$, Kimble Glass Co., No. 34507). The tube is heated in a small flame and drawn out to produce a smaller capillary mid-section about 0.2 mm. in diameter. The tube is then divided by snapping the small mid-section to give a portion sealed at one end, to be used for the capillary diffusion vessel, and a portion open at both ends, to be used as a micropipet for adding the serum samples to be assayed to the capillary. The dimensions of the capillary tube are not critical, however, the small capillary portion must be large enough to allow red cells and liquid agar to enter and small enough to support an agar column during gentle centrifugation.

Preparation of Sensitized Erythrocytes - Agarose Capillary Column

A suitable aliquot of sensitized erythrocytes is washed at room temperature twice with 10 times its volume of VBS buffer and finally suspended in VBS buffer to give the desired concentration of $3 \times 10^8$ cells/ml. Meanwhile, a 2 percent solution of agarose in VBS buffer is prepared in an autoclave, and a suitable volume brought to 50°–55°C. in a water bath. The suspension of sensitized erythrocytes is then warmed for about 1 minute in the water bath and an equal volume is added to the agarose solution in a small widemouthed bottle. In rapid succession the mixture is swirled, the capillary diffusion vessels are inserted open end down and the bottle is placed in a small vacuum desiccator, and partial evacuation is accomplished by momentarily connecting the desiccator to an evacuated vessel. (The ratio of the volume of this vessel to that of the desiccator determines the final length of the agarose column drawn into a capillary). After air bubbles have escaped from the capillaries through the still-liquid agarose, the vacuum is broken, forcing the sensitized erythrocyte-agarose mixture into the capillary vessels, which are then removed and placed, closed end down, in a small beaker containing about 1 cm. of cold water. This cold water cools the air in the capillary tubes, causing the still-liquid agar to be sucked further inside the tube, leaving a few millimeters of air space at the open end. The tubes are removed from the water after about 2 minutes, wiped dry on the outside and allowed to stand about 45 minutes until the agarose becomes firm. The end of the capillary is then sealed by first passing it through a small flame to expel some air and moisture and then by heating the tip until it just fuses, taking care not to burn the agarose near the tip or overheat it, causing disruption of the agarose column by expansion of trapped air bubbles.

Preparation of Serum Sample and Reading of the Assay

The unfilled end of the sensitized erythrocyte-agarose capillary is opened by nicking the tube with a diamond scribe a few mm. from the end and snapping off the closed piece. A 10–20 μl portion of guinea pig serum to be assayed is taken up in a micropipet and gently blown into the space above the sensitized erythrocyte — agarose, leaving a small air bubble trapped between the serum and the agarose. The tube is then centrifuged very gently for a few seconds to join the serum and the sensitized erythrocyte-agarose. Care is taken to centrifuge gently enough so that the serum does not mechanically penetrate between the agarose and the glass wall. The open end of the capillary is then sealed with paraffin. Replicates are prepared and dilutions of a standard serum are also prepared. The tubes are then incubated in a vertical position for about 17 hours at 23°C.

To measure the zone of lysis, each tube is then examined under a microscope having a 2.5x objective lens and 10x eyepiece containing a micrometer. The tube is manipulated so that the zero mark of the micrometer is centered over the part of the sensitized erythrocyte — agarose column which appears to have 50 percent of the cells lysed. A reading is then taken at the agarose meniscus. Normal serum reads about 10 scale units, representing 3 mm. of actual length.

Table I shows the results of a comparison between the complement method of this invention and the classical method using agarose as prepared herein. As expected, sera from guinea pigs irreversibly depleted of complement by cobra venom factor [the complement depleter of cobra venom prepared according to J. Immunology 103:944 (1969)] assayed very low in the present method as well as the classical method, i.e., Mayer's, supra. On the other hand, sera from guinea pigs treated with Suramin Sodium, a compound reported to have anticomplement activity [Fong, J. S. C. and Good, R. A., Clin. Exp. Immunol., 10, 127 (1972)], gave depressed values in the present test, but not in the classical method. Suramin Sodium appears to be a reversible inhibitor and its effects cannot be demonstrated using the classical dilution method.

TABLE 1

COMPARISON OF COMPLEMENT ASSAYS BY CLASSICAL DILUTION METHOD AND CAPILLARY METHOD ON SERA FROM GUINEA PIGS TREATED TO DEPRESS COMPLEMENT ACTIVITY

| Guinea Pig Number | Treatment[a] | Complement Classical[b] %[c] | Capillary %[c] |
|---|---|---|---|
| 1 | Cobra Factor[d] | 0 | 0 |
| 2 | | 0 | 0 |
| 3 | Suramin[e] | 82.5 | 24.3 |
| 4 | | 92.8 | 29.8 |
| 5 | Saline | 92.2 | 89.6 |
| 6 | | 90.5 | 100.6 |
| 7 | | 117.3 | 109.8 |

[a] All blood samples were collected by decapitation.
[b] Mayer's, M. M. in Kabat and Mayer's Experimental Immunochemistry by Kabat, E. A. and Mayer, M. M., Charles C. Thomas, Springfield, Illinois (1961).
[c] Average of values for animals 5, 6 and 7 was defined as 100%.
[d] Two intraperitoneal injections, 24 hours apart.
[e] Compound administered intraperitoneally at 300 mg./kg., 2 hours before sacrifice.

The experiment described in Example 1 was carried out using guinea pig serum because of convenience, however, the method has been applied with success to sera from such diverse animals as human, dog, rabbit, rat and hamster.

EXAMPLE 2

In a manner similar to that of Example 1, other sera were assayed using agar (Ionagar No. 2, Consolidated Laboratories, Inc.) in lieu of agarose.

EXAMPLE 3

A small glass capillary tube, about 3 mm. × 0.3 mm. diameter, open at both ends, was filled with sensitized erythrocytes in melted buffered agar (VBS) by touching one end to the warm suspension of cells prepared as in Example 1. After cooling to allow the agar to gel, the filled capillary was placed in contact with a serum sample contained in a somewhat larger glass capillary tube, sealed at one end, which acted as a microtest tube for the experiment. After a suitable time of incubation, it was observed that two zones of lysis, one at each end, had developed in the small filled capillary. These zones were measurable with the micrometer eye piece at the microscope.

Obviously, measurement could be simplified by using capillaries on which a suitable scale was etched, other vessels could be used to hold the serum, and other materials, plastics for example, could be used to hold the sensitized erythrocytes in the gel.

We claim:

1. A linear diffusion method for determining the hemolytic complement activity in undiluted serum which comprises:
   a. placing undiluted serum in interfacial contact with a suspension of sensitized erythrocytes in a buffered solidified gel contained in a capillary tube;
   b. incubating said capillary tube containing said serum and gel for a time sufficient to obtain a linear zone of lysis in said gel; and
   c. measuring the length of said zone in said gel and comparing same with a standard curve for quantitation.

2. A method according to claim 1 wherein the gel is agarose or agar.

3. A linear diffusion method for determining the hemolytic complement activity in undiluted serum which comprises:
   a. placing undiluted serum in the open end of an otherwise sealed capillary tube in interfacial contact with a suspension of sensitized erythrocytes in a buffered solidified gel contained in a capillary tube;
   b. closing the open end of said tube and incubating said tube containing said serum and gel for a time sufficient to obtain a linear zone of lysis in said gel; and
   c. measuring the length of said zone in said gel and comparing same with a standard curve for quantitation.

4. A method according to claim 3 wherein the gel is agarose or agar.

5. An incubated capillary tube for determining the hemolytic complement activity in undiluted serum by linear diffusion containing a suspension of sensitized erythrocytes in a buffered solidified gel and undiluted serum in interfacial contact with said gel, said gel having a linear zone of lysis therein extending from said interface.

6. An incubated capillary tube according to claim 5 wherein the gel is agarose or agar.

7. A sealed and incubated capillary tube for determining the hemolytic complement activity in undiluted serum by linear diffusion containing a suspension of sensitized erythrocytes in a buffered solidified gel and undiluted serum in interfacial contact with said gel, said gel having a linear zone of lysis therein extending from said interface.

8. A sealed and incubated capillary tube according to claim 7 where the gel is agarose or agar.

9. A method for preparing a sealed capillary tube for use in determining the hemolytic complement activity in undiluted serum by linear diffusion which comprises:
   a. inserting the open end of an otherwise sealed capillary tube in a suspension of sensitized erythrocytes in a liquid buffered gel in a container adapted for drawing a vacuum;
   b. drawing a partial vacuum on said container containing said tube;
   c. breaking said vacuum forcing a portion of the suspension of sensitized erythrocytes in liquid buffered gel from said container into said tube;
   d. removing said tube from said container and closing the open end of said tube.

10. A method according to claim 9 wherein the gel is agarose or agar.

11. A capillary tube for determining the hemolytic complement activity in undiluted serum by linear diffusion containing sensitized erythrocytes in a solidified buffered gel and an air space in interfactial contact with said gel for receiving said serum.

12. A capillary tube according to claim 11 wherein the gel is agarose or agar.

13. A sealed capillary tube for determining the hemolytic complement activity in undiluted serum by linear diffusion containing sensitized erythrocytes in a solidified buffered gel and an air space in interfacial contact with said gel for receiving said serum.

14. A capillary tube according to claim 13 wherein the gel is agarose or agar.

15. A kit for the determination of the hemolytic complement activity in undiluted serum by measurement of a linear zone of lysis in a gel chiefly comprising a plurality of capillary tubes, each tube containing a suspension of sensitized erythrocytes in a buffered solidified gel and an air space in interfacial contact with said gel for receiving said serum.

16. A kit according to claim 15 wherein the capillary tubes are sealed at both ends and the gel therein is agarose or agar.

* * * * *